United States Patent [19]

Wakabayashi et al.

[11] Patent Number: 5,142,319

[45] Date of Patent: Aug. 25, 1992

[54] CAMERA CONTROLLER HAVING DEVICE FOR ADVISING USER TO USE CAMERA FUNCTIONS

[75] Inventors: Hiroshi Wakabayashi; Noboru Akami, both of Yokohama, Japan

[73] Assignee: Nikon Corporation, Tokyo, Japan

[21] Appl. No.: 692,906

[22] Filed: Apr. 29, 1991

[30] Foreign Application Priority Data

May 7, 1990 [JP] Japan ................................ 2-117387

[51] Int. Cl.$^5$ ............................................. G03B 17/18
[52] U.S. Cl. ................................. 354/465; 354/289.1; 354/217
[58] Field of Search ............... 354/465, 466, 467, 468, 354/469, 470, 471, 472, 473, 474, 475, 289.1, 284.12, 217, 484

[56] References Cited

U.S. PATENT DOCUMENTS 4,269,496  5/1981  Motoori et al. ..................... 354/484
4,270,852  6/1981  Suzuki et al. ...................... 354/467

Primary Examiner—W. B. Perkey
Assistant Examiner—Cassandra Spyrou
Attorney, Agent, or Firm—Shapiro and Shapiro

[57] ABSTRACT

A camera controller advises a user of a camera to manipulate a selector to select a predetermined function so that even a beginner can fully utilize the functions of the camera. The camera controller comprises an externally manipulatable selector for selecting a predetermined function of the camera, a controller for causing the photographing with the predetermined function selected by the manipulation of the selector, a detector for determining whether the selector has been manipulated or not, and an advisor for advising the user to manipulate the selector when the detector detects that the selector has not been manipulated.

5 Claims, 7 Drawing Sheets

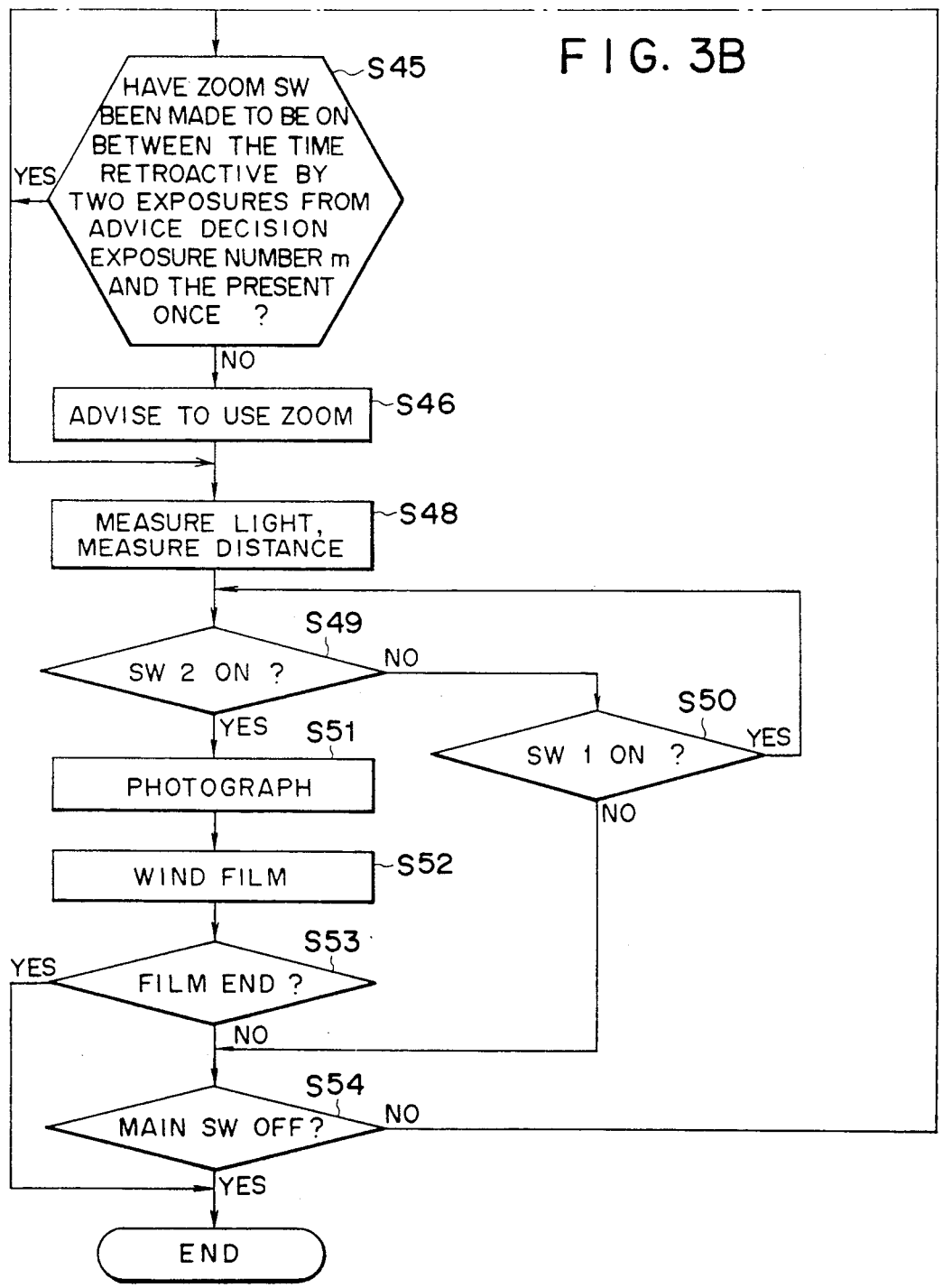

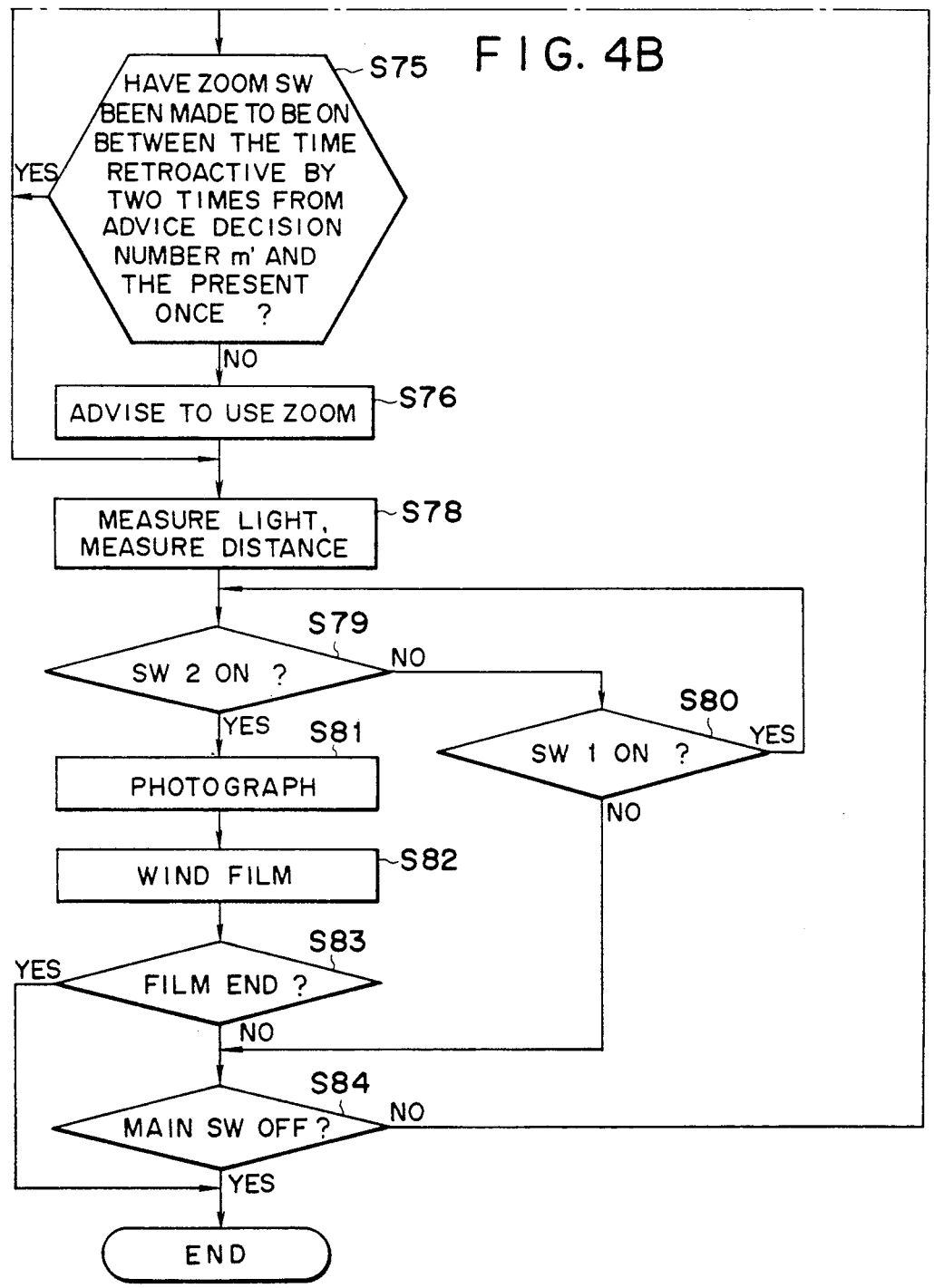

CAMERA CONTROLLER HAVING DEVICE FOR ADVISING USER TO USE CAMERA FUNCTIONS

BACKGROUND OF THE INVENTION

1. Field of the Invention

The present invention relates to a camera controller which can select various predetermined functions to take photographs in accordance with the selected predetermined functions.

2. Related Background Art

Photographs may be taken by selecting various functions such as a zooming function and an exposure correction function. Those functions may be set by manipulating a selection member which may be manipulated externally of a camera. In a recent camera, many functions are incorporated so that more functions may be selected for photographing.

However, in spite of the expansion of photographing application by the multi-function, a user (particularly a beginner) cannot easily set the functions or may not ever know that those functions can be selected, and an effective use of the camera is not attained.

SUMMARY OF THE INVENTION

In accordance with the present invention, non-use of a camera function is detected, and a user is advised to manipulate a selector for that function, when the selector has not been manipulated within a predetermined time interval or prior to exposure of a number of film frames, for example. By virtue of the invention, more extensive use of various camera functions is attained.

It is an object of the present invention to provide a camera which enables even a beginner to fully utilize the functions.

In order to solve the above problems, the present invention provides a camera having an externally manipulatable selector for selecting a predetermined function of a camera and a controller for causing photographing in accordance with the predetermined function selected by the selector, comprising:

a detector for detecting whether the selector has been manipulated or not; and an advisor for advising a user to manipulate the selector when the detector detects that the selector has not been manipulated.

The camera further comprises:

a timer for counting a predetermined time in response to the manipulation of the selector;

wherein the detector detects whether the selector has been manipulated within the predetermined time counted by the timer.

The camera further comprises:

a counter or a film feed control circuit for counting the number of exposed frames of a film;

wherein the detector detects whether the selector has been manipulated before the counting of a predetermined number of frames by the counter is completed.

The camera further comprises:

an external display;

wherein the advisor causes the display to advise the user to manipulate the selector when the detector detects that the selector has not been manipulated.

Further, the advisor forces the photographing with the preselected function without regard to the manipulation of the selector when the detector detects that the selector has not been manipulated.

In accordance with the present invention, when the detector detects that the selector has not been manipulated, the advisor advises the user to manipulate the selector. Accordingly, the failure of the user to notice the selection of the functions is avoided and the functions can be effectively utilized and the photographing application is expanded.

BRIEF DESCRIPTION OF THE DRAWINGS

FIGS. 3A and 3B and 4A and 4B show flow charts of control procedures of the CPU 1 in second and third embodiments.

DETAILED DESCRIPTION OF THE PREFERRED EMBODIMENTS

One embodiment of the present invention is now explained with reference to the drawings.

Figure 1:
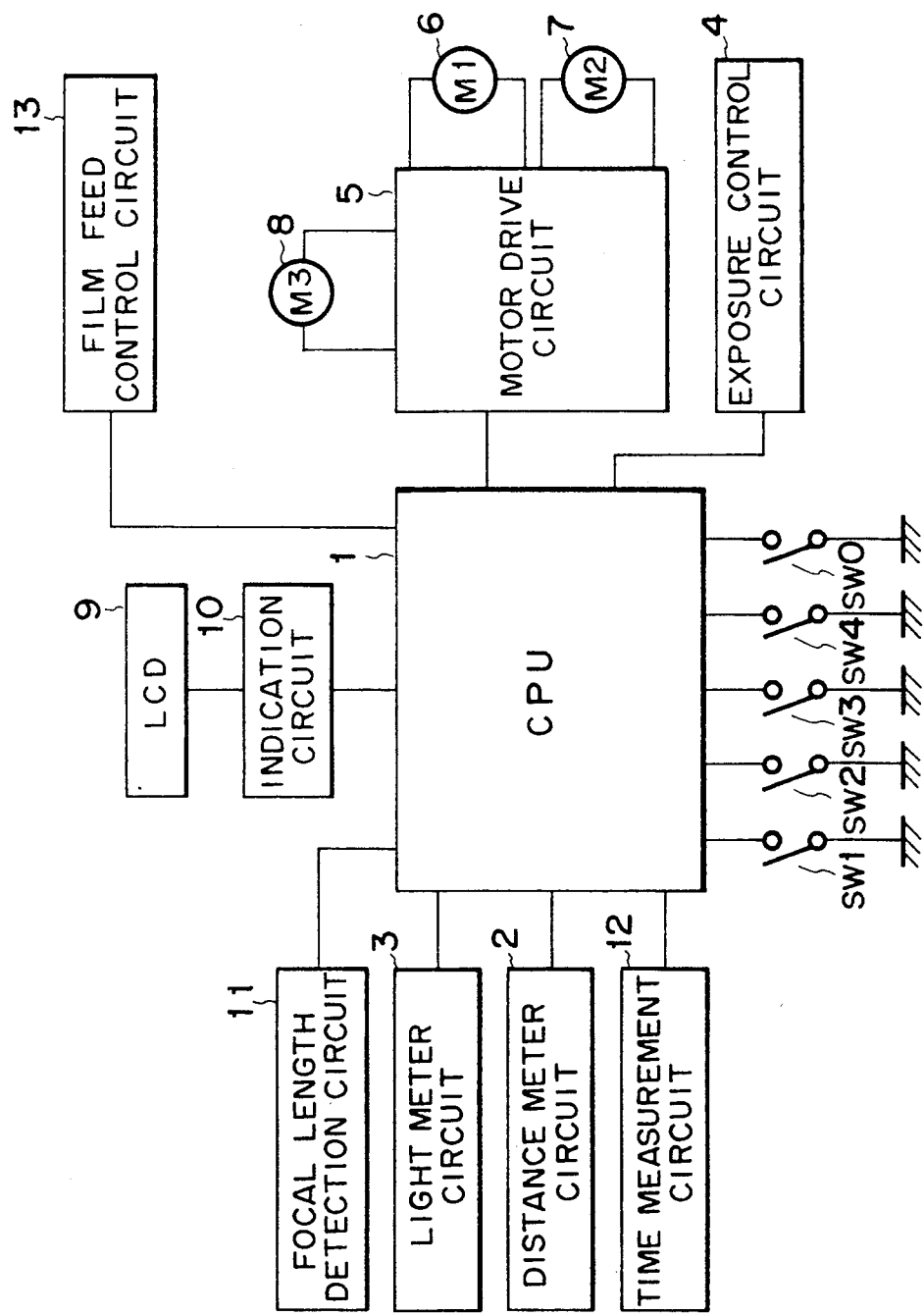
FIG. 1 shows a block diagram of a camera controller in one embodiment of the present invention.

FIG. 1 shows a block diagram of a camera controller of the embodiment.

In FIG. 1, connected to a CPU 1 which controls an overall sequence of the camera are a ranging circuit 2, a photometry circuit 3, an exposure control circuit 4, a motor drive circuit 5 and a focal distance detection circuit 11. Connected to the motor drive circuit 5 is a focusing motor 6, a zooming motor 7 and a film wind-up motor 8.

The ranging circuit 2 calculates range information for a distance to an object, and the photometry circuit 3 calculates brightness information for a brightness of the object.

The CPU 1 calculates a lens drive amount for focusing based on the range information calculated by the ranging circuit 2 and drives a photographing lens by a motor through the motor drive circuit 5 in accordance with the lens drive amount, for focusing. A position of the photographing lens driven by the motor 6 is detected by the focal distance detection circuit 11.

The CPU 1 further drives an exposure control member (shutter and aperture) through the exposure control circuit 4 based on the photometry information calculated by the photometry circuit 3, and after the exposure, it winds up a film by one frame by the motor 8.

A timer circuit 12 and a film feed control circuit 13 are connected to the CPU 1. The timer circuit 12 counts a predetermined time and the film feed control circuit 13 detects the number of exposed film frames and the end of the film.

A switch SW0 which is linked to the manipulation of an externally manipulatable power switch to supply power to the camera, and switches SW1 and SW2 which are linked to the manipulation of a release member are connected to the CPU 1. The switch SW0 is turned on by the manipulation of the power switch, the switch SW1 is turned on by the half depression of the release member, and the switch SW2 is turned on by the full depression of the release member.

When the camera is ready to operate by the turn on of the switch SW0, the CPU 1 activates the ranging circuit 2 and the photometry circuit 3 by turning on the switch SW1 and activates the exposure control circuit 4 and the motor drive circuit 5 in response to a release signal produced by the turn-on of the switch SW2.

A display circuit 10 for a liquid crystal display (LCD) 9 is connected to the CPU 1. When various predetermined functions of the camera are selected, they are displayed on the LCD 9 by the display circuit 10.

A zoom-up switch SW3 and a zoom-down switch SW4 are connected to the CPU 1. The switches SW3 and SW4 are turned on by the manipulation of zoom buttons (not shown). The CPU 1 drives the photographing lens to a desired focal distance position in the zoom-up mode or the zoom-down mode by a zooming motor 7 through the motor drive circuit in response to the turn-on of the switch SW3 or SW4.

In a normal photographing mode, the photographing lens is movable between a wide end (focal distance 35 mm) and a telescope end (focal distance 80 mm) so that the photographing at any focal distance therebetween is permitted. In a storage mode of the camera where the photographing does not take place, the photographing lens is driven into a sinking position from the wide end to disable the photographing.

A control procedure by the CPU 1 is now explained with reference to flow charts of FIGS. 2 and 3.

First Embodiment

A first embodiment is explained first.

In the first embodiment, the time counting of a predetermined time (approximately 30 seconds) is started as the power switch is turned on. If it is detected that the zoom button has not been manipulated before the end of the predetermined time, the use of the zoom function is advised to the user.

The first embodiment is now explained in detail with reference to FIG. 2.

Figure 2A:
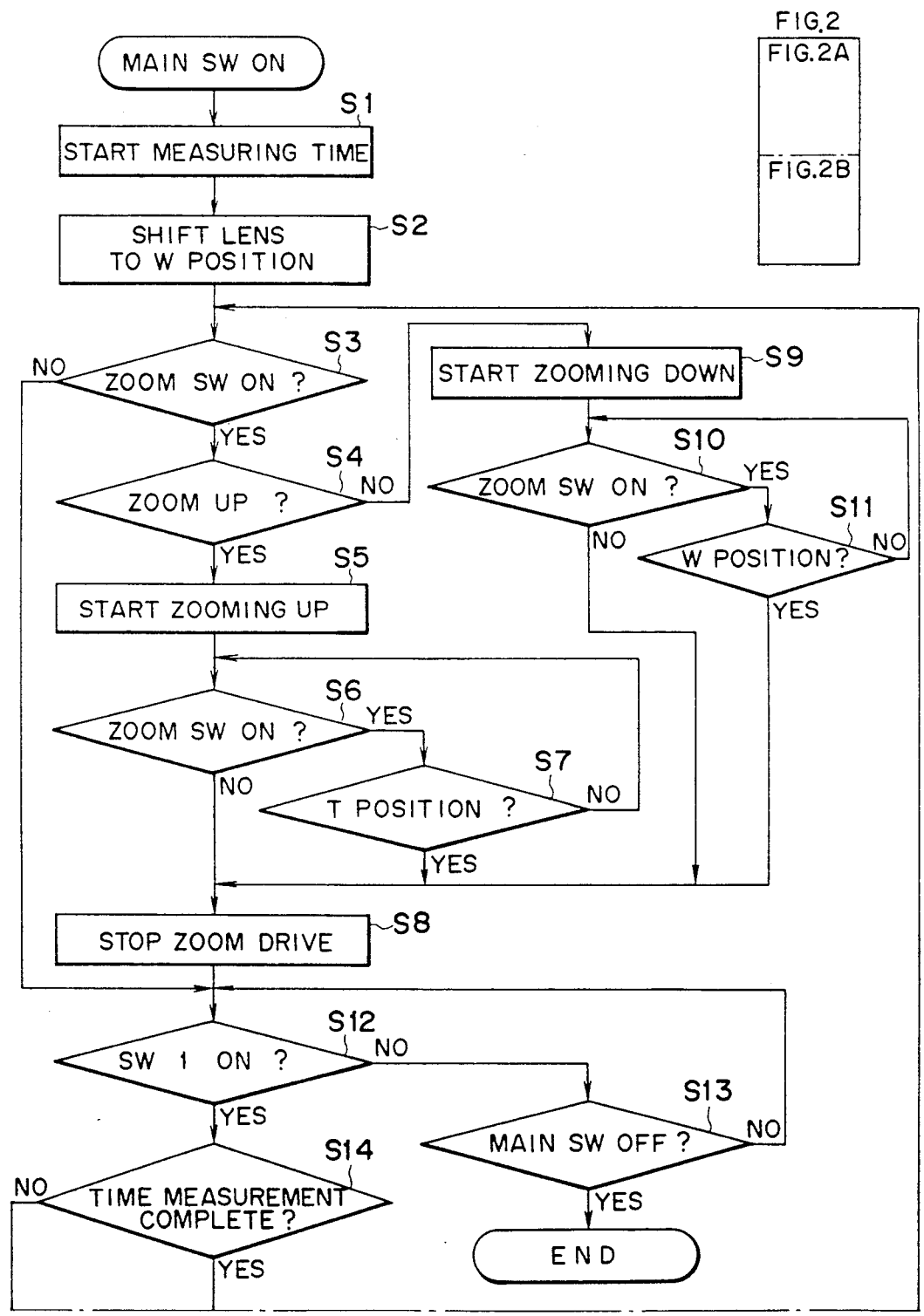
FIG. 2A and 2B shows a flow chart of a control procedure of a CPU 1 in the first embodiment.
Figure 2B:
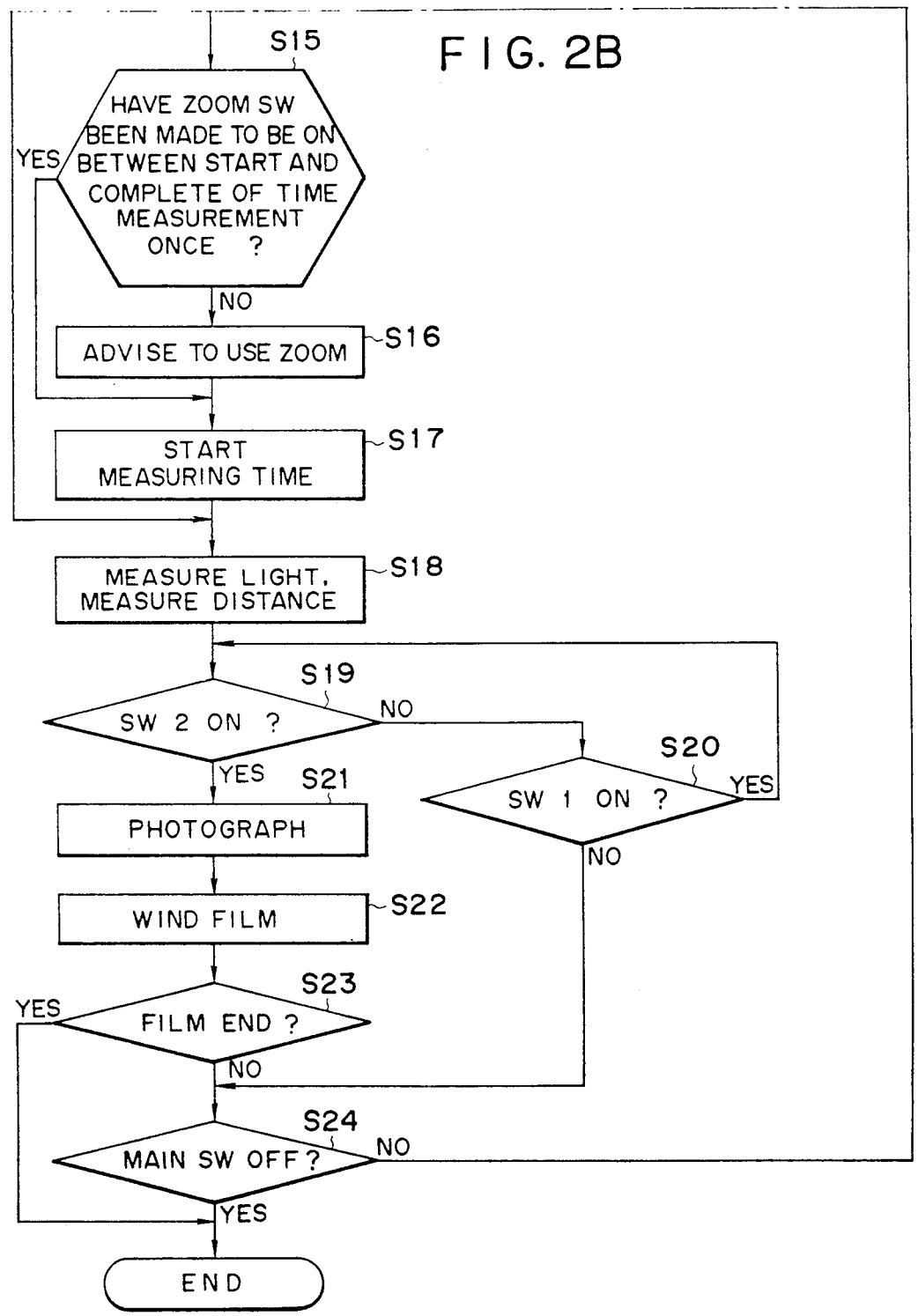

FIG. 2 shows a flow chart of a control procedure of the CPU 1 in the first embodiment.

The sequence is started when the switch SW0 is turned on by the manipulation of the power switch.
(Step S1)

In a step S1, the time counting of the predetermined time, 30 seconds, is started by the timer circuit 12.
(Step S2)

In a step S2, the photographing lens is driven out from the sinking position to the wide end by the zooming motor 7 through the motor drive circuit 5 so that the camera is ready to photograph.
(Step S3)

In a step S3, whether the zoom button has been manipulated or not, that is, whether either the zoom-up switch SW3 or the zoom-down switch SW4 has been turned on or not is determined. If the decision is YES, the process proceeds to a step S4, and if the decision is NO, the process proceeds to a step S12.
(Step S4)

In the step S4, whether the zoom-up switch SW3 has been turned on or not is determined. That is, whether the manipulation of the zoom button in the step S3 indicates the zoom-up drive or the zoom-down drive is determined. If the decision is YES, the process proceeds to a step S5, and if the decision is NO, the process proceeds to a step S9.
(Step S5)

In the step S5, the photographing lens is driven in the zoom-up mode, that is, it is zoomed from the wide end to the telescope end. Then, the process proceeds to a step S6.
(Step S6)

In the step S6, whether the zoom-up switch SW3 is continuously turned on or not, that is, whether the zoom button is continuously manipulated or not is determined. If the decision is YES, the process proceeds to a step S7, and if the decision is NO, the process proceeds to a step S8.
(Step S7)

In the step S7, whether the photographing lens has been driven to the telescope end or not is determined. If the decision is YES, the process proceeds to the step S8, and if the decision is NO, the process returns to the step S6.
(Step S8)

In the step S8, the zoom drive of the photographing lens is stopped. Then, the process proceeds to a step S12.
(Step S9)

If the decision in the step S4 is NO, that is, if it is determined that the zoom-up switch SW3 has not been turned on, the photographing lens is driven in the zoom-down mode in the step S9, that is, it is driven from the telescope end to the wide end.

If the power switch is manipulated, however, the photographing lens is driven out from the sinking position to the wide end as the power switch is manipulated and the zoom-down drive is not carried out. Then, the process proceeds to a step S10.
(Step S10)

In the step S10, whether the zoom-down switch SW4 is continuously turned on or not, that is, whether the zoom button is continuously manipulated or not is determined. If the decision is YES, the process proceeds to a step S11 and if the decision is NO, the process proceeds to the step S8.
(Step S11)

In the step S11, whether the photographing lens has been driven to the wide end or not is determined. If the decision is NO, the process returns to the step S10, and if the decision is YES, the process proceeds to the step S8.

The zoom button commands to drive the photographing lens between the telescope end and the wide end. If the manipulation is released in the course of the drive, the zoom drive of the photographing lens is stopped at that point. Accordingly, in order to drive the photographing lens to the telescope end or the wide end, it is necessary not to release the manipulation in the course of the drive but to continuously manipulate it.
(Step S12)

In the step S12, whether the release member is half-depressed or not, that is, whether the switch SW1 is turned on or not is determined. If the decision is YES, the process proceeds to a step S14, and if the decision is NO, the process proceeds to a step S13.
(Step S13)

In the step S13, whether the power supply has been turned off by the manipulation of the power switch or not, that is, whether the switch SW0 has been turned off or not is determined. If the decision is NO, the process returns to the step S12, and if the decision is YES, the process terminates.
(Step S14)

In the step S14, whether the time counting of the predetermined time started in the step S1 has been completed or not is determined. If the decision is NO, the process proceeds to a step S18, and if the decision is YES, the process proceeds to a step S15.
(Step S15)

In the step S15, whether the zoom button has been manipulated at least once between the start and the end of the time counting of the predetermined time or not, that is, whether either the zoom switch SW3 or SW4 has been turned on or not is determined.

Namely, in the step S15, whether the user has photographed by using the zoom function at least once between the start and the end of the time counting of the predetermined time or not is determined. If the decision is YES, the process proceeds to a step S17, and if the decision is NO, the process proceeds to a step S16.
(Step S16)

In the step S16, the manipulation of the zoom button, that is, the photographing by the use of the zoom function is advised to the user. The advice may be given in the following manners.

①  The photographing lens is reciprocally driven between the wide end and the telescope end by the zooming motor 7 through the motor drive circuit 5 without regard to the manipulation of the zoom button. (In this case, if the release member is manipulated before the photographing lens is driven to the telescope end, it is preferable to immediately drive the photographing lens to the wide end to start the photographing mode.)

②  Display (for example, character display such as "effectively use functions" is displayed on the LCD 8 to advise the photographing by using the zoom function to the user.

Alternatively, the display of the zoom function may be flashed, an externally observable LED provided on the zoom button may be flashed, or a second may be generated for the advice.

If the zoom button has not been manipulated between the start and the end of the time counting of the predetermined time, that is, if the zoom function of the camera has not been effectively used in spite of the existence of the zoom function in the camera, the the advice ① or ② is carried out to advice the use of the zoom function to the user so that the function is effectively utilized. After the advice in the step S16, the process proceeds to a step S17.
(Step S17)

In the step S17, the time counting of the predetermined time is resumed by the timer circuit 12. Then, the process proceeds to a step S18.
(Step 18)

In the step S18, the photometry information from the photometry circuit 3 and the range information from the ranging circuit 2 are read. Then, the process proceeds to a step S19.
(Step S19)

In the step S19, whether the switch SW2 has been turned on by the full depression of the release member or not is determined. If the decision is YES, the process proceeds to a step S21, and if the decision is NO, the process proceeds to a step S20.
(Step S20)

In the step S20, whether the switch SW1 has been turned on by the half depression of the release member or not is determined. If the decision is YES, the process returns to the step S19, and if the decision is NO, the process proceeds to a step S24.
(Step S21)

In the step S21, the focusing is carried out based on the range information read in the step S18, and the exposure control member (not shown) is driven by the exposure control circuit 4 in accordance with the photometry information, film sensitivity information, and lens aperture information (F-value information) determined by the preset focal distance. Then, the process proceeds to a step S22.
(Step S22)

In the step S22, the motor 8 is driven by the motor drive circuit 5 to wind up the film by one frame. Then, the process proceeds to a step S23.
(Step S23)

In the step S23, whether the end of the film has been detected by the film feed control circuit 13 is determined. If the decision is YES, the process terminates, and if the decision is NO, the process proceeds to a step S24.
(Step S24)

In the step S24, whether the power supply has been turned off by the manipulation of the power switch that is, whether the switch SW0 has been turned off is determined. If the decision is YES, the process terminates, and if the decision is NO, the process returns to the step S3 to repeat the above loop.

In the first embodiment, the time counting of the predetermined time is started as the power switch is manipulated, and if it is detected that the zoom button has not been manipulated before the end of the predetermined time, the use of the zoom function is advised to the user.

In the prior art, the user may carry out the photographing without noticing that the zoom function can be selected and the function is not effectively utilized. In the first embodiment, even the beginner who is not familiar with the camera can effectively utilize the zoom function so that the application of photographing can be expanded.

Second Embodiment

A second embodiment is now explained.

In the first embodiment, the time counting of the predetermined time is started as the power switch is manipulated, and if it is detected that the zoom button has not been manipulated before the end of the predetermined time, the use of the zoom function is advised to the user.

On the other hand, in the second embodiment, the number of exposed frames of the film is counted, and if the zoom button has not been manipulated before the count reaches a predetermined count, the advice is carried out.

The second embodiment is explained in detail with reference to FIG. 3.

Figure 3A:
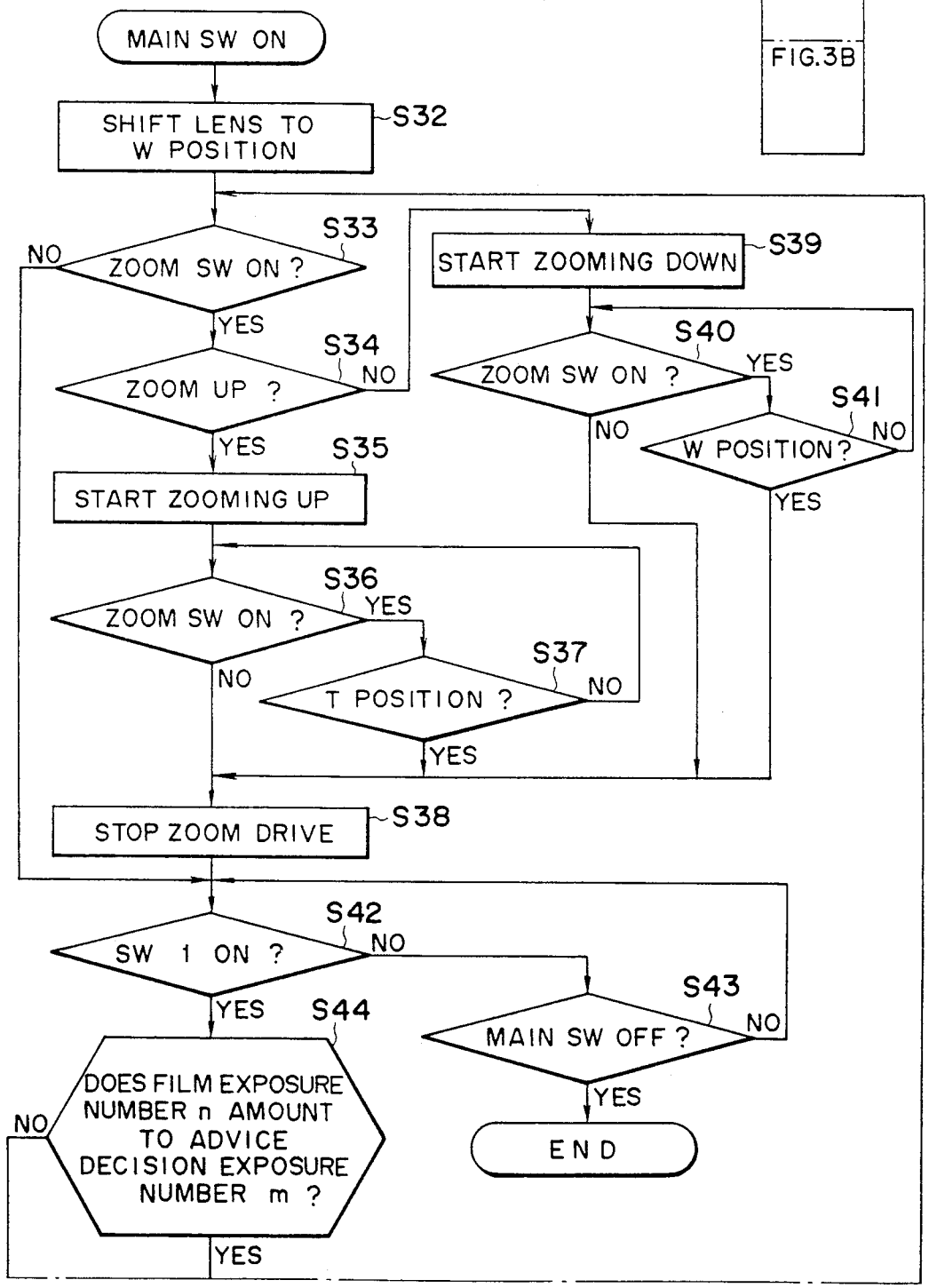

FIG. 3 shows a flow chart of a control procedure of the CPU 1 in the second embodiment. A main sequence is substantially identical to that in the first embodiment and the explanation of the duplicated portions is omitted.

In FIG. 3, the sequence is started by the turn-on of the switch SW0 by the manipulation of the power switch, as it is in the first embodiment.
(Step S44)

In a step S44, whether the number of exposed frames of the film counted by the film feed control circuit 13 has reached an advising frame count m (for example, 3, 6, 9, ... m frames) or not is determined. If the decision is NO, the process proceeds to a step S48, and if the decision is YES, the process proceeds to a step S45.
(Step S45)

In the step S45, whether the zoom button has been manipulated at least once between the current time and a time point corresponding to the advising frame count m minus 2 or not, that is, whether either the zoom switch SW3 or SW4 has been turned on during that period is determined.

For example, assuming that the advising frame count is set to 3 and a new film is loaded for photographing, whether the photographing with the zoom function has been carried out by the user between the film loading and the exposure of three frames of the film is determined in the step S45. If the decision is YES, the process proceeds to a step S48, and if the decision is NO, the process proceeds to a step S46.

(Step S46)

In the step S46, the manipulation of the zoom button, that is, the photographing by using the zoom function is advised to the user. The advice may be carried out in the same manner as that of the first embodiment. Then, the process proceeds to a step S48.

In the step S45, the advising frame count is set to 3. When the process returns from the step S54 to the step S33 and again to the step S44, the advising frame count is updated to 6.

When the number of exposed frames reaches 6, whether the zoom button has been manipulated between the current time and the time point corresponding to (6-2) frames or not is determined. When the step S44 is further carried out, the advising frame count is sequentially updated to 9, 12, . . . .

In the second embodiment, the number of exposed frames of the film is counted, and if the zoom button has not been manipulated before the count reaches the predetermined count, the use of the zoom function is advised to the user.

Accordingly, in the second embodiment, even the beginner who is not familiar with the camera can effectively utilize the zoom function and expand the application of the photographing as he/she can in the first embodiment.

In the second embodiment, since the number of exposed frames of the film is counted, whether the photographing with the zoom function has been actually done or not can be exactly determined.

More specifically, in the first embodiment described above, the time counting is started by the manipulation of the power switch, and whether the zoom function has been used before the end of the predetermined time is determined. Accordingly, if the predetermined time has passed in a stand-by state where no manipulation of the camera is made after the manipulation of the power switch, that is, if the predetermined time has passed without taking a photograph on any frame of the film, it is determined that the zoom function has not been used. Thus, in the first embodiment, the non-use of the zoom function is determined even if the photographing has not actually been done. In the second embodiment, no such determination is made.

Third Embodiment

A third embodiment is now explained.

In the second embodiment described above, the number of exposed frames of the film is counted, and if the zoom button is not manipulated before the count reaches the predetermined count, the use of the zoom function is advised to the user.

In the third embodiment, the number of times of the turn-on of the switch SW0 by the manipulation of the power switch is counted, and if the zoom button is not manipulated before the count reaches the predetermined count, the use of the zoom function is advised to the user.

The third embodiment is explained in detail with reference to FIG. 4.

Figure 4A:
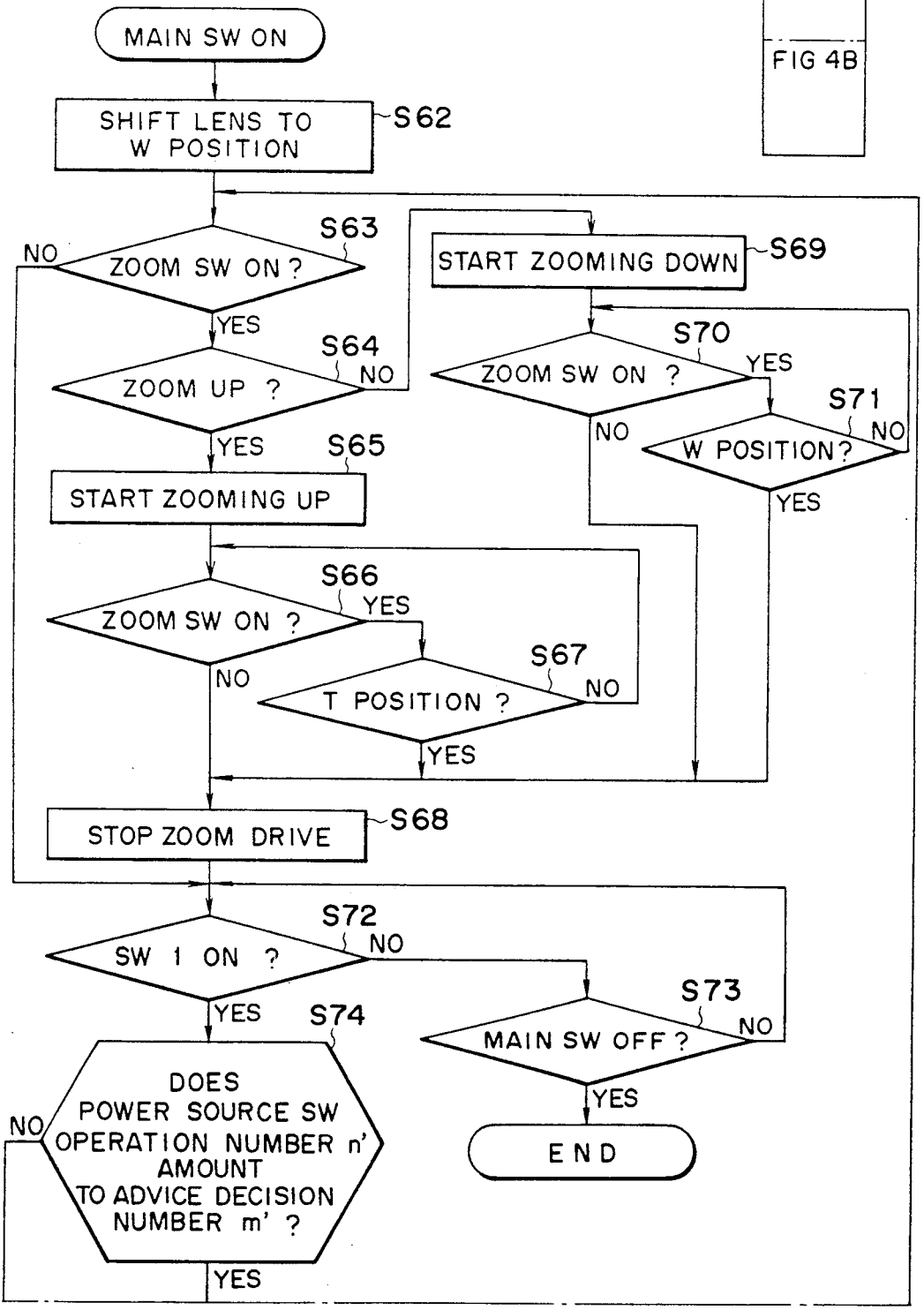

FIG. 4 shows a flow chart of a control procedure of the CPU 1 in the third embodiment. A main sequence flow is substantially identical to those of the first and second embodiments, and the explanation of duplicated portions is omitted.

In FIG. 4, the sequence is started by the turn-on of the switch SW0 as the power switch is manipulated, as it is in the first embodiment. The number of times of the manipulation of the power switch is stored in the CPU 1 even after the power supply has been turned off.

(Step S74)

In a step S74, whether the number of times of the manipulation of the power switch counted by the CPU 1, that is, the number of times of the turn-on of the switch SW0 has reached an advising number of times m' (for example, 3, 6, 9, . . . m') or not is determined. If the decision is NO, the process proceeds to a step S78, and if the decision is YES, the process proceeds to a step S75.

(Step S75)

In the step S75, whether the zoom button has been manipulated at least once between the current time and the time point corresponding to the advising number of times m' minus 2 is determined, that is, whether either the zoom switch SW3 or SW4 has been turned on during that period is determined.

In the step S75, assuming that the advising number of times is set to 3, the number of times of the turn-on of the switch SW0 is counted and whether the user has photographed by using the zoom function at least once before the count reaches 3 is determined. If the decision is YES, the process proceeds to a step S78, and if the decision is NO, the process proceeds to a step S76.

(Step S76)

In the step S76, the manipulation of the zoom button, that is, the photographing by using the zoom function is advised to the user. The advice may be made in the same manner as those in the first and second embodiments.

In the third embodiment, the number of times of the turn-on of the switch SW0 by the manipulation of the power switch is counted, and if the zoom button is not manipulated before the count reaches the predetermined count, the use of the zoom function is advised to the user.

In accordance with the third embodiment, even the beginner who is not familiar with the camera can effectively utilize the zoom function and expand the application of photographing, as he/she can in the first and second embodiments.

In the second and third embodiments, the number of exposed frames of the film and the number of times of the manipulation of the power switch are preset, respectively, in advising the use of the zoom function. Alternatively, the predetermined counts for the number of exposed frames and the number of times of the manipulation may be changed in accordance with the frequency of use of the function. For example, for the zoom function which is considered to have a relatively high frequency of use, the advising frame count may be set to 3, and for the exposure correction function which is considered to have a relatively low frequency of use, it may be set to 6.

In the above embodiments, the zoom function was explained as the predetermined function of the camera although the present invention is not limited to the zoom function but it is equally applicable to a self-timer function, an exposure correction function, and a zoom continuous photographing function in which the zooming drive of the photographing lens by the zooming motor through the motor drive circuit 5 and the photographing are alternately carried out so that an object is photographed sequentially with a plurality of focal distances (35 mm, 50 mm, 80 mm). Where the use of a plurality of functions is to be advised, the function having a high frequency of use (for example, the zoom function) is preferably advised with a top priority.

Since the zoom continuous photographing mode is set as a photographing mode, the zoom continuous photographing mode may be forcibly set for a predetermined time as the advise to the user without regard to the mode selected by the user.

Alternatively, the number of exposed frames of the film after the previous use of the zoom function may be counted, and if the zoom button has not been manipulated before the count reaches the predetermined count, the use of the zoom continuous photographing function may be advised.

The use of the zoom function and the zoom continuous photographing mode can be recognized by the user by visually observing the drive-out and the drive-in of the photographing lens. However, the use of the self timer function or the exposure correction function cannot be recognized without actual photographing.

Accordingly, the advice of those functions is done only by the LCD 9. However, it is highly possible that a sufficient advice may not be made to the user by only the LCD 9. Accordingly, it is desirable to provide means such as one which generates sound.

In accordance with the present invention, when the detector detects that the selector has not been manipulated, the advice is made to urge the user to use the selector. Accordingly, the failure of notice of the user to the selection of the function is avoided, the functions can be effectively utilized and the application of the photographing is expanded.

What is claimed is:

1. A camera controller comprising:
   externally manipulatable selection means for selecting a predetermined function of a camera;
   control means for causing photographing in accordance with the predetermined function selected by said selection means;
   detection means for detecting whether said selection means has been manipulated; and
   means for advising a user to manipulate said selection means when said detection means detects that said selection means has not been manipulated within a predetermined time interval or before completion of a predetermined number of camera operations.

2. A camera controller according to claim 1 further comprising:
   timer means for counting a predetermined time in response to the manipulation of said selection means;
   said detection means detecting whether said selection means has been manipulated within said predetermined time counted by said timer means.

3. A camera controller according to claim 1 further comprising:
   count means for counting the number of exposed frames of a film;
   said detection means detecting whether said selection means has been manipulated before the counting of a predetermined number of frames by said count means.

4. A camera controller according to claim 1 further comprising:
   external display means;
   said advising means causing said display means to advise the user to manipulate said selection means when said detection means detects that said selection means has not been manipulated.

5. A camera controller according to claim 1 wherein said advising means forces photographing with the predetermined function without regard to the manipulation of said selection means when said detector detects that said selection means has not been manipulated.

* * * * *